United States Patent [19]
Clarke

[11] Patent Number: 5,623,349
[45] Date of Patent: Apr. 22, 1997

[54] LIQUID CRYSTAL PROJECTION SYSTEM HAVING THREE DIFFERENT COLOR BEAMS PASS THROUGH SUBSTANTIALLY SEPARATE AREAS AND FILTER AT LIQUID CRYSTAL PANEL OUTPUT

[75] Inventor: John A. Clarke, Carshalton, England

[73] Assignee: U.S. Philips Corporation, New York, N.Y.

[21] Appl. No.: 495,129

[22] Filed: Jun. 27, 1995

[30] Foreign Application Priority Data

Jul. 9, 1994 [GB] United Kingdom ............... 9413883

[51] Int. Cl.$^6$ ................................... G02F 1/1335
[52] U.S. Cl. ................ 349/8; 349/95; 349/106
[58] Field of Search ................ 359/40, 41, 68, 359/69, 64

[56] References Cited

U.S. PATENT DOCUMENTS

| | | | |
|---|---|---|---|
| 5,121,030 | 6/1992 | Schott | 359/68 |
| 5,159,478 | 10/1992 | Akiyama et al. | 359/68 |
| 5,161,042 | 11/1992 | Hamada | 350/41 |
| 5,187,599 | 2/1993 | Nakanishi et al. | 359/41 |

FOREIGN PATENT DOCUMENTS

| | | | |
|---|---|---|---|
| 0465171 | 1/1992 | European Pat. Off. . | |
| 0490171 | 6/1992 | European Pat. Off. | 359/40 |
| 2152724 | 8/1985 | United Kingdom | 359/40 |

Primary Examiner—Anita Pellman Gross
Assistant Examiner—Julie-Huyen Ngo
Attorney, Agent, or Firm—John C. Fox

[57] ABSTRACT

In a color liquid crystal projection display in which three differently-colored illuminating beams (R,G,B) are incident from mutually different directions on an LC panel (20) having an array of display elements (40) with a microlens array (21) at the input side of the panel comprising microlens elements (42) overlying groups of display elements that direct light from the beams through respective sets of display elements, and a projection lens (30) projects the output beams from the panel onto a screen (31), the beam geometries are selected such that at a position spaced from the output side of the panel the three output beams pass respectively through substantially separate areas and filter means (50) are disposed at that position to remove unwanted color stray light at each area thus improving color purity. Each microlens element of the array directs light from one color beam onto one display element and light from the other two beams onto respective display elements which are not immediately adjacent that one display element.

16 Claims, 3 Drawing Sheets

LIQUID CRYSTAL PROJECTION SYSTEM HAVING THREE DIFFERENT COLOR BEAMS PASS THROUGH SUBSTANTIALLY SEPARATE AREAS AND FILTER AT LIQUID CRYSTAL PANEL OUTPUT

BACKGROUND OF THE INVENTION

The present invention relates to a colour liquid crystal projection display system comprising a liquid crystal panel having an array of display elements for modulating light to produce a display output, illuminating means for directing three differently-coloured light illuminating beams onto the panel such that they are incident on the panel from mutually different directions, the panel being provided with a microlens array at its input side for directing the three different colours of input light onto respective sets of the display elements in the array, each microlens element overlying a group of three display elements, and a projection lens for collecting the display output from the panel and projecting the display output onto a screen.

A projection system of this kind is known from EP-A-0465171. In a described embodiment, a white light source, comprising for example a metal halide arc lamp, generates a beam of generally parallel white light which is directed onto a set of three dichroic mirrors whose planes are arranged at mutually different slant angles. These dichroic mirrors produce respectively three differently-coloured, red (R), green (G) and blue (B), beams of light which are directed towards the input side of the liquid crystal panel such that the three beams are incident upon the panel from three different directions, with the central beam arriving perpendicularly to the panel, and overlap at the region of the panel. The panel carries a microlens array at its input side. Each microlens element in the array overlies a group of three immediately adjacent LC display elements in a row of the display element array, constituting red (R), green (G) and blue (B) display elements, and serves to converge and direct light from each of the three, R, G and B, differently-coloured input light beams through a respective one of those three display elements. The display elements modulate the light passing therethrough in accordance with applied R, G, B video signals. The modulated light outputs from all the display elements in the array so illuminated are collected by a projection lens for projection onto the display screen.

This system has advantages over other known kinds of colour LC projection systems. In comparison with the kind of system which uses three separate LC panels each operable with a respective colour light, the number of components and complexity of the system is, of course, considerably reduced, although the display element density of the panel has to be three times as great to provide the same display resolution. In comparison with conventional colour LC projection systems using a single LC panel in which colour is obtained by using a red, green and blue colour microfilter array in association with the display elements in conjunction with an illuminating beam of white light, the light output, and hence brightness, is significantly increased for a given light source as around two thirds of the input light in the conventional system is absorbed or reflected by the colour filters.

However, the system described in EP-A-0465171 is not without its own problems and can suffer from the effects of stray light which lead to a display image with inferior colour purity and colour contrast being produced. It is mentioned in EP-A-0465171 that problems with stray light may be caused by the degree of parallelisation of the illuminating light being poor, so that the illuminating beams are incident on the panel from directions other than the predetermined directions. In such a case it is suggested that the light from the light source could be converged on spots by a condensing lens and unnecessary light cut out using a slit or a pin hole. Besides making the system more complex and more expensive, this would require more space and thus be unsuitable for a compact projection system.

OBJECTS AND SUMMARY OF THE INVENTION

It is an object of the present invention to provide an improved colour LC projection display system.

According to the present invention, there is provided a colour LC projection system of the kind described in the opening paragraph which is characterised in that the directions of the three differently-coloured illuminating beams incident on the panel are selected with respect to one another and to the microlens elements of the microlens array such that at a position spaced from the output side of the panel the three beams pass respectively through substantially spatially separate areas and in that filter means are provided at said position for removing at each area light of a colour other than that of the beam associated with that area.

The invention results in a display of improved colour purity and with higher colour contrast by removing unwanted colour components, and primarily those components due to stray light effects, in the panel's output before they reach the screen. The invention stems from a recognition that, firstly, there are a number of sources of stray light in the system other than simply stray light resulting from the non-parallelity of the light beams incident on the panel as mentioned in EP-A-0465171, and, secondly, that at least most of the stray light can be removed conveniently on the output side of the panel by filtering provided that the three differently coloured beams at this region are sufficiently separated.

One source of stray light is the light source itself and the dimensions of its light generating region. For example, an arc lamp, such as a metal halid arc lamp, has a certain size of arc and light that originates away from the bright central portion of the arc gives rise to stray light. The microlens elements image this arc on to the display elements, ideally with the bright portion just underfilling the open area, i.e. aperture, of the display elements. Light from the weaker, outer, regions of the arc can thus easily be imaged on adjacent display elements.

The structure of the microlens array itself can also lead to stray light through scattering of light at the joins between the microlens elements. The surfaces of the lens elements, or the interface between normal and doped material in the case of gradient index kinds of microlens arrays, can also scatter light. Furthermore, the structure of the circuitry is on the substrates of the LC panel, for example the row and column address conductors and, in active matrix type panels, switching devices, may also result in light being scattered.

With the present invention, at least a substantial proportion of all this stray light is removed before it can be projected onto the screen through arranging that a position exists where the three differently coloured beams are separate from one another and by an appropriately filtering each beam at that position. Because the three intended colour light beams follow well defined paths, this is relatively easy to achieve. By suitable arrangement of the system components, appropriately directed illuminating beams can be provided in convenient manner.

The aperture stop location of the projection lens is a preferred suitable region for the filter means. With the three beams then passing through respective different parts of the aperture a three segment coloured filter can be placed at this position to absorb any light of the wrong colour at each part. The aperture stop is considered to be the most desirable place in which the accommodate the filter means in simple and convenient manner. At this position the beams are more well defined than elsewhere.

The microlens elements of the microlens array each operate, as described in EP-A-04651 71, to converge and focus light from each of the three differently coloured illuminating beams onto a respective one of three display elements associated with the microlens element (or three columns of display element in the case of cylindrical microlens elements being used), so that after passing through the display elements the individual light outputs from the display elements are diverging. In the system of EP-A-0465171, the three display elements concerned are those which underlie the microlens element. In order to provide a position where the three output beams are separate from one another in a convenient manner the angles between the three beams at the panel output side can be increased so that they are greater than the individual beam spreads. In a preferred embodiment of the invention, this is achieved by arranging that for each microlens element light from the two illuminating beams to either side of the third illuminating beam is directed through respective display elements to either side of one display element through which light from the third beam is directed which are not immediately adjacent to the one display element. Light from the two side beams may be directed respectively to the next but one display elements on either side of the one display element. Assuming that one light beam is directed substantially normally onto the display panel, light from this beam is directed by one microlens element through a display element underlying this microlens element, for example the nth display element in the row, whereas light from the illuminating beams to either side of this one beam is directed respectively to the (n+2)th and (n−2)th display elements. Alternatively, light from the two side beams may be directed respectively onto the next but three display elements to either side of the one display element, i.e. the (n+4)th and (n−4)th display elements, in a row.

Each microlens element may be arranged to overlie a group of three adjacent display elements in a row of display elements or three adjacent display elements in a delta arrangement in the case where a so-called delta array of display elements layout is desired.

The microlens array may comprise an array of semi-cylindrical microlens elements extending in parallel columnwise of the display element array, as described in EP-A-0465171, or alternatively an array of spherical, or toroidal, microlens elements in rectangular or hexagonal format. Spherical microlens elements would be required for the aforementioned delta colour d splay element layout. Spherical, or toroidal microlens elements, rather than cylindrical elements, are considered to be more preferable as cylindrical microlens elements would likely waste more light and could also be a further source of stray light as they focus light only in one dimension.

BRIEF DESCRIPTION OF THE DRAWINGS

Embodiments of colour liquid crystal projection display systems in accordance with the invention will now be described, by way of example, with reference to the accompanying drawings, in which.

It should be understood that the Figures are merely schematic and are not drawn to scale. In particular certain dimensions such as thicknesses and spacings may have been exaggerated whilst other dimensions may have been reduced.

DESCRIPTION OF THE PREFERRED EMBODIMENTS

Figure 1:
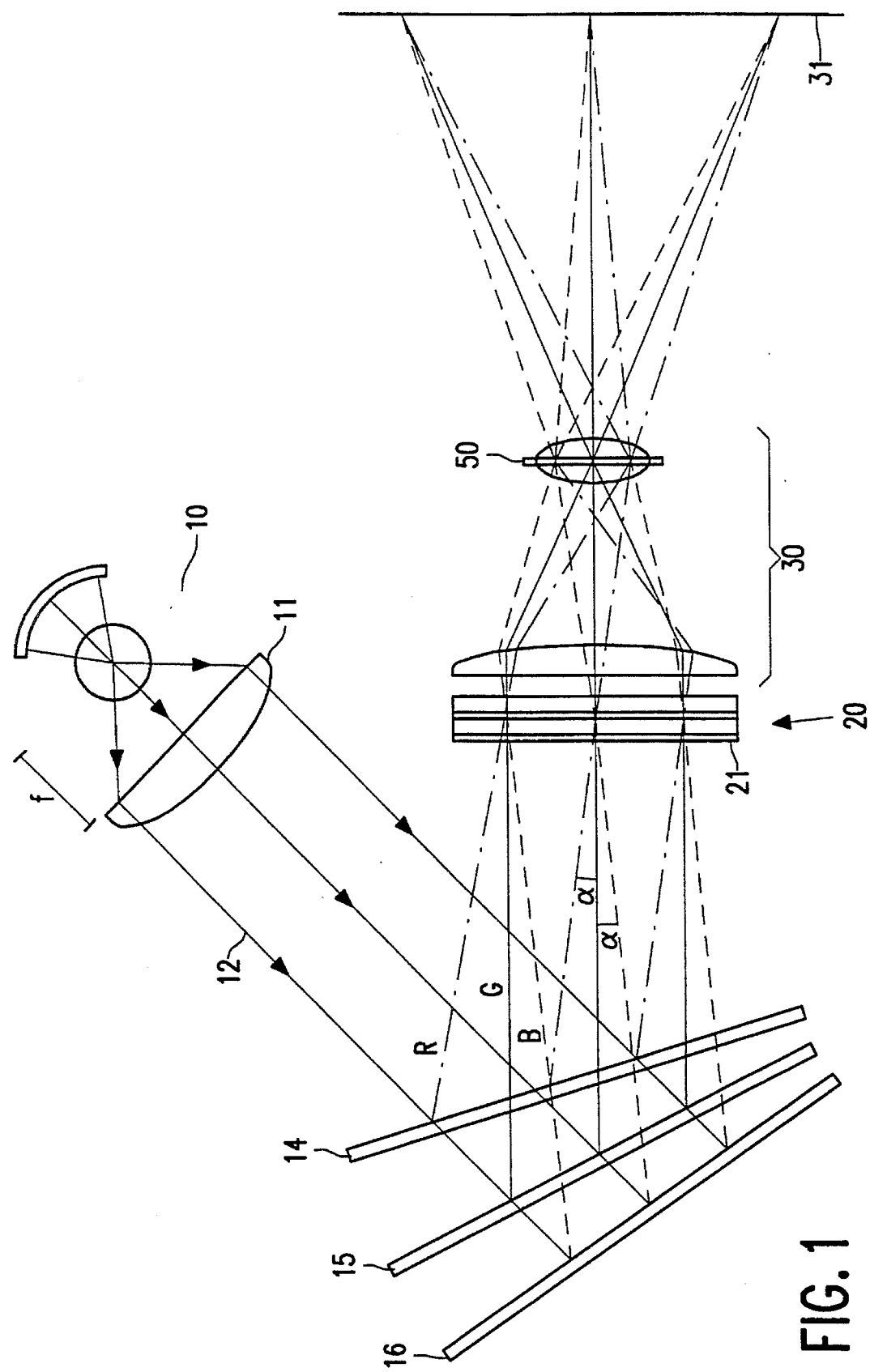
FIG. 1 is a schematic diagram of a colour LC projection display system according to the present invention.

Referring to FIG. 1, the projection system, which may be used for TV or datagraphic display purposes, comprises a light source 10, preferably in the form of an arc lamp, which generates white light that is directed, with the aid of a rear reflector, through a condenser lens 11 to form a generally parallel beam 12 of white light. A set of three dichroic mirrors 14, 15, 16, slantingly arranged with respect to the beam 12 at mutually different angles of rotation around an imaginary axis, separates the white light into red, R, green, G, and blue, B, component beams. Red light, represented by dotted lines, is reflected from the input surface of the first mirror 14. Of the transmitted blue and green light, the green light, represented by solid lines, is reflected from the input surface of the second mirror 15 back through the mirror 14. The transmitted blue light, represented by the dashed lines, is reflected by the mirror 16 back through both the mirrors 15 and 14. The three differently coloured, R, G and B light beams are directed onto an LC display panel 20 having a microlens array 21 at its input side. The light source, dichroic mirrors and LC panel are arranged relative to one another such that the three differently coloured illuminating beams, R, G and B, are incident on the LC panel from mutually different directions with the green beam arriving substantially perpendicularly to the plane of the panel and with the blue and red beams arriving at an angle, designated $\alpha$ in FIG. 1, to either side of the perpendicular.

The LC panel 20 is of a conventional form and consists of a row and column array of individually operable LC display elements. The microlens array 21 consists of a set of microlens elements, each microlens element being aligned with, and overlying, a respective group of three adjacent display elements. The microlens array 21 serves to focus light from the red, green and blue illuminating beams through respective display elements associated with each microlens element, and hence respective sets of the display elements, where the light is modulated according to an applied video signal.

In operation, the microlens elements each focus light of the three differently coloured, and differently directed, illuminating beams obtained by splitting the white light from the light source into three line images, each of which is coincident with a respective display element. The display elements of the panel 20 are driven to modulate their respective light inputs in conventional fashion by an associated drive circuit (not shown) to which a video signal is applied by selecting the rows of display elements of the array in turn and driving the display elements in a selected row according to the video information in the video signal, this operation being repeated for successive fields of the video signal to produce successive display output fields. The display light output from the panel 20, comprising the individual modulated light outputs of the thus operated display elements, is collected by a single projection lens 30 and projected onto a screen 31 where an image is displayed. With this system, therefore, only one LC panel and one projection lens are required to produce a full colour projection display.

The projection system as described thus far is similar in many respects to that described in EP-A-0465171 to which reference is invited for further description of the general construction and operating principles of the light source 10, the set of dichroic mirrors 14, 15 and 16, and the LC display panel 20 and its microlens array 21, and whose disclosure in these respects is incorporated herein by reference.

Figure 2:
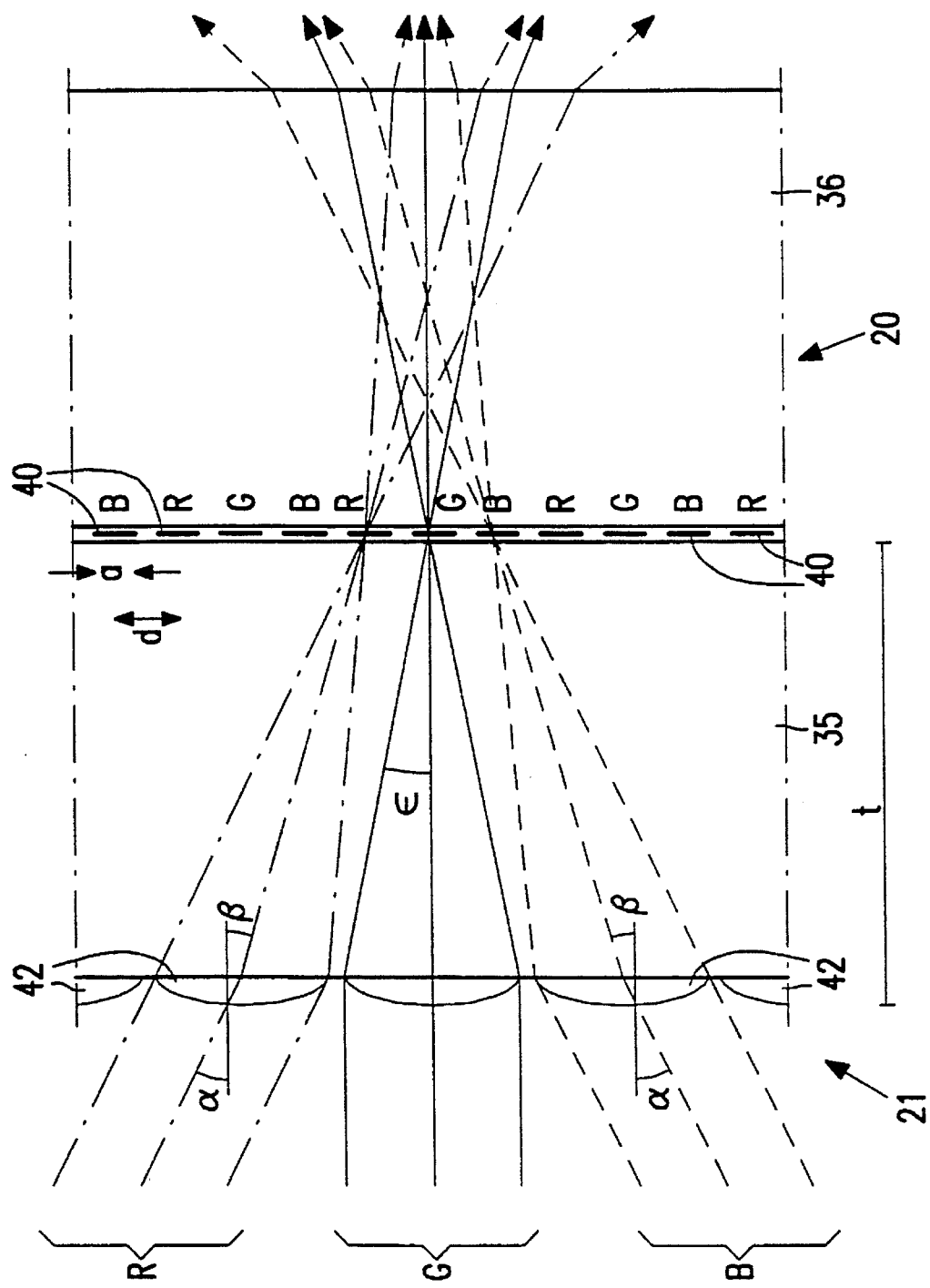
FIG. 2 is an enlarged schematic cross-section view through an LC panel in one embodiment of the system of FIG. 1 showing example light paths in operation.
Figure 3:
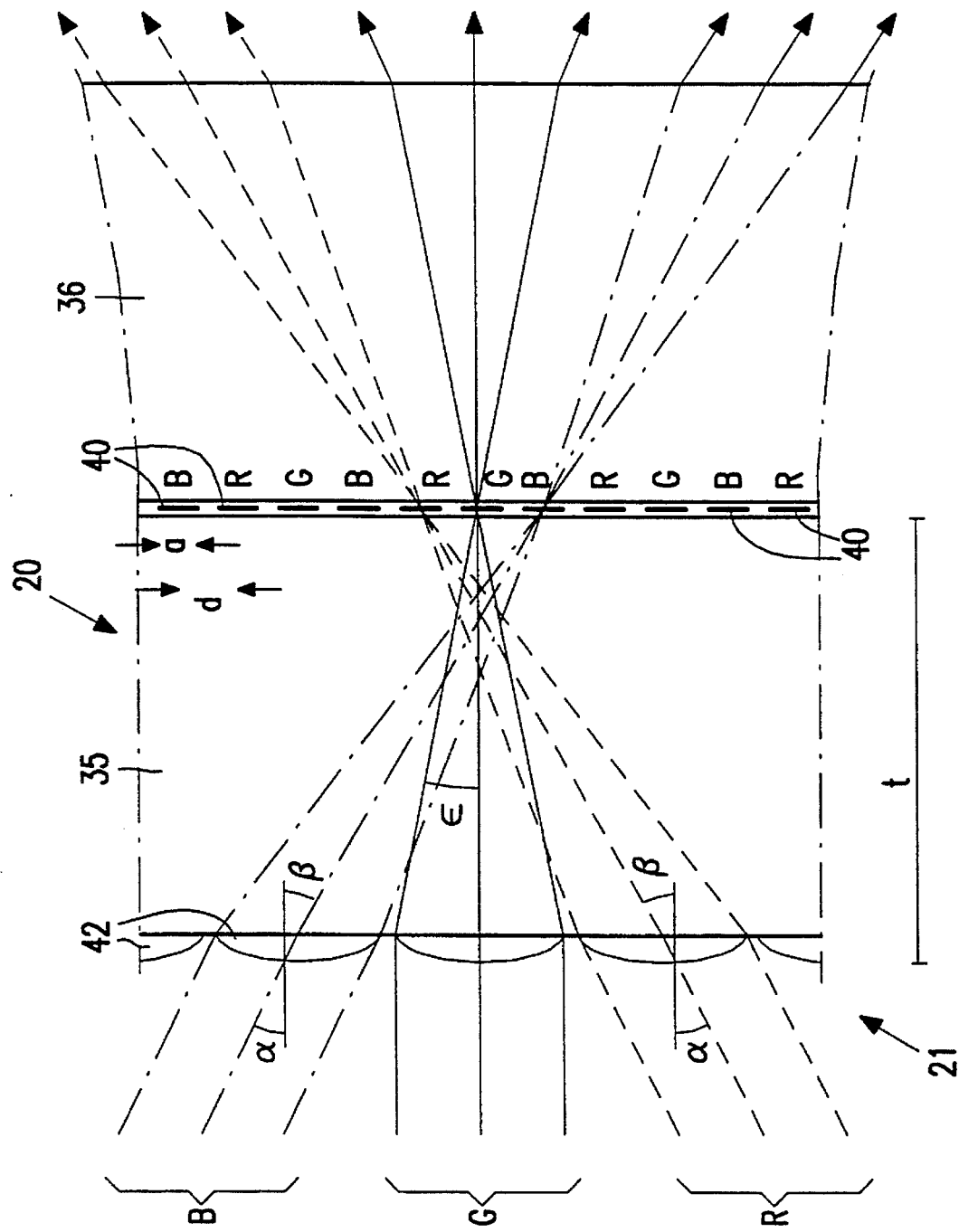
FIG. 3 is an enlarged schematic cross-section view through an LC panel in another embodiment of the system of FIG. 1 showing example light paths in operation.

The projection system of FIG. 1, however, has important differences over that of EP-A-0465171 which lead to an advantageous improvement in the colour reproduction and contrast of the display image obtained. The projection system, as will be described in greater detail with reference to FIGS. 2 and 3 illustrating two alternative embodiments, overcomes particularly problems due to stray light which causes loss of colour purity and contrast.

Stray light can result from a number of sources. One source is the light which originates away from the central bright region of the arc of the light source 10. Ideally, the light source should be a point source but because the arc lamp generates an arc of finite length the light of the illuminating beam produced by the condenser lens 11, and consequently the light of each of the differently coloured illuminating beams directed onto the panel 10, will not be completely parallel. In the system of EP-A-0465171, each microlens element of the array overlies a respective group of three immediately adjacent display elements and images the arc in red, green and blue on those underlying three display elements respectively. For optimum effectiveness, the bright part of the imaged arc preferably should just underfill the open area of each display element. As a result of doing this, however, and because the three illuminating beams are not completely parallel but are spreading slightly, light from the weaker outer portions of the arc can easily be imaged on the display elements to either side of the display element receiving the bright part of the imaged arc which display elements are each intended to receive only light of a different colour.

The structure of the microlens array 21 can also lead to stray light, particularly the regions separating adjacent microlens elements from which light can be scattered, and the surfaces of the microlens elements, or, in the case of gradient index type microlens, the interface between normal and doped material, which can also scatter light. Similarly, the circuitry carried on the substrates of the LC panel 10, such as the sets of row and column address conductors, and also, in the case of an active matrix LC panel, the switching elements, for example, TFTs, can also cause scattered light. As with the stray light effects caused by the finite arc length, this scattered light can lead to display elements receiving light of a colour other than that of the particular colour intended. A display element intended to operate solely with, for example, red light may thus receive small amounts of blue and green light as well which, after modulation, is collected and projected onto the screen and this "wrong" colour light is responsible for the degradation of colour purity.

In the projection system of FIG. 1, at least most of this stray light is removed before reaching the screen so that the display image has much improved colour purity. The manner in which this is achieved results from an appreciation of the fact that the "correct" colour light follows well defined paths through the system and the recognition that if the paths of the differently coloured "correct" light are distinctly defined at some point between the panel and the screen then a substantial proportion of the stray light of the "wrong" colour can be removed in a simple and convenient manner. To this end, therefore, the directions of the three differently coloured light beams relative to one another and to the microlens array are selected such that at a position spaced from the output side of the panel the three, modulated, beams are largely separated and pass respectively through substantially separate spatial areas at that position, and colour filter means, as indicated for example at 50 in FIG. 1, are disposed at that position which, with regard to each of the areas, allows only light of the correct colour to pass therethrough. Thus, the filter means, which can comprise a simple three segment, red, green and blue, coloured filter, absorbs any stray light of the wrong colour from the red, green and blue output beams from the panel 20.

By virtue of the beams passing through substantially separate areas at a position spaced from the output side of the panel, the projection system of FIG. 1 differs significantly from that of EP-A-0465171 in which, after passing through the panel, the three illumination beams are such that, while their centre lines are still at an angle to each other, they have a spread, i.e. divergence, introduced by the microlens elements which means that the three colours partly overlap. This is in addition to the spreading as a consequence of the finite size of the arc. Because of the overlapping nature of the spreading beams, filtering cannot be used to remove stray light.

It would not be feasible to try to create a position where the three beams are spatially separate which makes selective colour filtering possible by just selecting, for example, the size of the light source, the focal length of the microlens elements, the distance between the microlens elements and the display elements, and the display elements' spacing and open areas. Instead, the geometry, particularly of the beams, is altered.

Two embodiments of the projection system demonstrating alternative ways of achieving this objective will be described with reference to FIGS. 2 and 3 which each show schematically a cross-section through a part of the LC panel and light paths therethrough. In both cases, the important consideration, bearing in mind that the microlens elements introduce an additional spread, is to increase the angles between the three colours emerging from the panel so that they become substantially separate. For a given display element spacing and display element to microlens element distance using the geometry of the system of EP-A-0465171 the angle between the beams would appear to be fixed and if adjacent microlens elements touch each other, that is, the individual elements are not spaced from one another to any significant extent, this angle is smaller than the individual beam spreads. The desired objective of separating the beams is achieved by arranging that the two side beams, that is, the beams to either side of the beam arriving perpendicularly to the plane of the panel, do not go through the display elements immediately adjacent the centre beam display element but through the next display elements, (FIG. 2), or even further away, (FIG. 3), instead.

FIG. 2 shows a cross-section through a typical part of the LC panel 20. The panel 20 comprises two spaced substrates 35 and 36 with twisted nematic LC material disposed therebetween which carry respectively sets of electrodes (not shown) defining a row and column array of display elements, some of which elements from one row are shown here as simple blocks 40 with the letter R, G or B denoting their associated colour. The microlens array 21 carried on the outer surface of the substrate 35 consists of microlens elements 42 each of which is aligned with a respective group of three adjacent display elements in the row and directly overlies that group, the width of the microlens element corresponding approximately with the width of the group. Green light arriving at a microlens element 42 substantially perpendicularly to the plane of the substrate 35 is focused by that element onto the central, G, display element 40 of its underlying group as depicted by the ray paths in FIG. 2. Instead of the red and blue light arriving at that microlens element being focused on the display elements immediately next to, on either side of, the green, central, display element, as in the system of EP-A-0465171, the red and blue light is focused respectively on the next but one display elements to either side of that central, green, display element. Assuming, for example, that the mth microlens element of the array overlies the (n−1)th, nth, and (n+1)th display elements in the row, then the green light is directed onto the nth display element in the row by the mth microlens element 42, and the red and blue side beams arriving at that mth microlens elements are directed respectively to the (n+2)th display element and (n−2)th display element respectively. (The paths of the red and blue light through the mth microlens element are not actually shown in FIG. 2 for reasons of clarity). Red and blue light is directed onto the (n−1)th and (n+1)th display elements immediately to either side of the central, nth, display element, i.e. by the (m−1)th and (m+1)th microlens elements to either side of the aforementioned, mth, microlens element, as is depicted by the ray paths in FIG. 2. The appropriate colour light is directed onto each of the other display elements in the row by the microlens elements in similar fashion. Other rows of display elements are illuminated in the same manner.

To this end, the directions of the red and blue illuminating beams are appropriately angled by equal amounts to opposite sides of the perpendicular to the panel, corresponding to the direction of the green illuminating beam. As can be seen from FIG. 2, the red, green and blue modulated outputs from the panel 20 are still spreading but, importantly, the angles between the three colours, as determined by the directions of their centre lines, are much greater than those in the system of FP-A-0465171 so that at a distance away from the panel the red, green and blue output beams become substantially separate and overlap only to a very small extent. At a region spaced from the output side of the panel 20, therefore, the three beams pass through substantially separate and distinct areas, in a plane parallel to the panel, with only very slight overlap between the green and blue beams and the green and red beams, thereby permitting a three segment colour filter to be positioned at that region to absorb most of the unwanted colours and allow mainly light of the correct colour to pass at each of these substantially separate areas, and consequently reducing unwanted light of the wrong colour being projected onto the screen. The aperture stop location in the projection lens is particularly convenient position for the segmental colour filter. A three segment colour filter, shown schematically at 50 in FIG. 1, can be accommodated in a simple and easy manner at the aperture stop location.

In the embodiment of FIG. 3, in which the same reference numerals are used to denote like parts, the arrangement of the microlens elements in relation to the display elements is the same as before and the green illuminating beam again is directed substantially perpendicularly to the plane of the panel 20. The red and blue illuminating beams are also directed at substantially equal angles to either side of the axis of the green beam. However, in this embodiment, the red and blue illuminating beams are now directed at increased angles to the perpendicular so that, for a given microlens element 42, green light is still directed onto the central display element 40 of the underlying group of three display elements but the red and blue side beams are focused by that microlens element respectively onto the next but three display elements to either side of that central display element. Thus, assuming the mth microlens element of the array overlies the (n−1)th, nth and (n+1)th display elements, the green beam is focused by the mth microlens element onto the nth display element, and the red and blue side beams are focused by that mth microlens element onto respectively the (n+4)th and (n−4)th display elements. Blue and red light is directed onto respectively the display elements immediately to either side of the central, nth, display element, i.e. the (n+1)th and (n−1)th display elements by the (m−1)th and (m+1)th microlens elements as depicted by the ray paths shown in FIG. 3. The appropriate colour light is directed onto each of the other display elements in the row by the microlens elements in similar fashion. The other rows of display elements are illuminated in the same manner.

In this embodiment, therefore, the angles between the red, green and blue modulated output beams from the panel 20, as defined by their centre lines, are now greater than the individual beam spreads. Compared with the embodiment of FIG. 2, the angles are larger so that at a distance from the panel 20 the red, green and blue output beams are completely separate, occupying distinct spatial areas in a plane parallel to the panel 20. A three segment filter, indicated at 50 in FIG. 1, and again arranged at the aperture stop of the projection lens then absorbs unwanted colours and allows only light of the correct colour to pass at each of these separate areas, thereby preventing unwanted light of the wrong colour being projected onto the screen.

With compact arc lamps and typical display element sizes and substrate thicknesses, the total angular spread of the output beams in both embodiments can be made quite small. The aperture of the projection lens 30 is determined by this angular spread.

A brief mathematical explanation of the optical design criteria for the projection systems of FIGS. 1, 2 and 3 will now be given.

In FIG. 1, the three dichroic mirrors 14, 15 and 16 are arranged with a small angle $\alpha/2$ between them, so the centre lines of the R, G and B illumination beams after reflection are at an angle $\alpha$ to each other. Referring to FIGS. 2 and 3, the light beams are refracted by the curved surfaces of the microlens elements 42. However, at the centre of any microlens element the surface is parallel to the substrate 35 of the panel 20 so the light that passes through at this point is only deviated due to the refractive index difference. If n is the refractive index of the substrate material, Snell's refraction law can be applied, giving an angle $\beta$ between the centrelines of the green beams and each of the two, red and blue, side beams inside the substrate, where $n.\sin \beta = \sin \alpha$. If t is the thickness of the substrate 35 together with the microlens element, and d is the spacing of the individual display elements and if the two side beams are directed by a microlens element onto the two display elements immediately to either side of the central, green, display element of the underlying group of three display elements as in the case of EP-A-0465171, then the angle between the beams must satisfy the relation $\tan \beta = d/t$. Thus for a given thickness of substrate and a given display element spacing, the angle $\beta$, and hence the angle $\alpha$, is uniquely determined. If however the two side beams pass through the next but one display elements, as in FIG. 2, then tan $\beta$=2 d/t. Passing through the third display element is not viable in a three colour system, but passing through the fourth display element, as in FIG. 3 would give tan $\beta$=4 d/t.

The thickness of the substrate and the display element spacing have to satisfy another relation which depends on the spread of the light about the centreline in the beam of any one colour. This in turn is determined by the size of the light source and the effective focal length, f, of the collection optics (11 in FIG. 1). If the length of the arc of the light source, in the plane of FIG. 1, is x, and if the light beam emerging from the collection optics is substantially collimated, then the angular spread, $\gamma$, in the beam is given by $\gamma=\pm\tan^{-1}[x/2f]$. After refraction at the microlens element surface, the angular spread, $\pm\delta$, inside the substrate is given by n.sin $\delta$=sin $\gamma$. Again considering the centre part of the microlens element, and, for simplicity, the centre, green, beam, this light must not spread out further than one display element. Preferably the light must be within the open area, a, of the display element so the relation a/2t>tan $\delta$ is obtained. There are slightly more complex relations for the off-centre beams. Thus there is a maximum substrate thickness that can be tolerated with any given display element spacing and angular spread.

The power of the microlens element, which is determined by its radius of curvature, (or refractive index profile in the case of gradient index lenses), is used to control the rays which are not at the centre of the microlens element. In particular, the rays at the extreme of the microlens elements must pass through some part of the correct display element. If all of the beam spread tolerance, $\pm\delta$, has been used, then the power of the microlens element should be such that the extreme rays are refracted to cross the centreline at the centre of the display element. This means that the focal length, f', of the microlens elements is approximately equal to t/n. For this condition to apply to all three beams implies that the microlens elements have a flat image. This is unlikely to be the case, so a compromise focal surface is needed that departs slightly from the above simple relation. Assuming the individual microlens elements touch each other and therefore have a width substantially equal to three display element spacings, then to a first approximation the angular spread, $\epsilon$, in the central beam passing through the liquid crystal cell is given by $\pm[\tan^{-1}(3 d/2 t)+\delta]$. The side beams will have this spread offset by the angle $\beta$. If the light beam emerging from the collection optics, 11, is not substantially collimated, the above equations need to be modified slightly, but the overall result can be found that the light source is approximately imaged on to the display elements, with a magnification small enough that the image falls inside a display element.

The maximum angle, $\epsilon$, for the centre colour is $[\tan^{-1}(3 d/2 t)+\delta]$. The minimum angle for the side colour is $\beta-[\tan^{-1}(3 d/2 t)+\delta]$. Even if $\delta$ is almost zero, $\epsilon$ is greater than $\beta$ if adjacent display elements are used for the three colours, so over half of the beams would overlap. If every other display element is considered, as in the case of FIG. 2, $\epsilon$ could easily be less than $\beta$, so less than half the beams would overlap. By going to every fourth display, as in the case of FIG. 3, the beams would never overlap if $\delta$ were within the limit given above. The angles $\beta$ and $\epsilon$ are inversely proportional to the combined substrate and lens thickness, t. It is therefore desirable to maximise t, while maintaining the inequality a/2 t>tan $\delta$. This implies that the limiting case is a value for t such that the image of the light source just underfills the open area of a single display element. A small arc size compact lamp is therefore desirable. If in the projection lens 30 a straightforward condenser lens, as shown adjacent the output side of the panel 20 in FIG. 1, is used at a Numerical Aperture (NA) of 0.7, and the panel 20 has a diagonal of, say, 75 mm, then a 1 mm arc length would give a beam divergence of $\gamma=\pm0.55°$. If the open part of the display element has a dimension, a, of 40µ, then the substrate thickness could be up to 3 mm. Assuming a 50µ centre to centre spacing, d, of the display elements, $\beta$=7.6° and $\epsilon$=1.4°.

It will be appreciated that various modifications to the projection system are possible. The light source could be a metal halide or xenon arc lamp but other light sources, for example, a halogen lamp, can be used as mentioned in EP-A0465171. Also, it is not necessary to use a single white light source together with a set of dichroic mirrors to provide the three illuminating beams. Instead, separate, red, green and blue light sources may be employed, as is also mentioned in EP-A0465171.

The LC panel 20 is preferably an active matrix panel using TFTs or two terminal non-linear devices as switching elements although a simple multiplexed panel could be used.

Various different kinds of microlens arrays produced by different fabrication techniques can be used, as discussed in EP-A-0465171. In the above described embodiments, a microlens array having semicylindrical microlens elements extending in parallel columnwise can be used which requires that the columns of display elements comprise respective colours. Spherical microlens elements arranged in rectangular or hexagonal formats may be used, each lens element overlying a group of three adjacent elements. Spherical lens element allow either three in line or a so-called delta array lay-outs of colour display elements to be used.

From reading the present disclosure, other modifications will be apparent to persons skilled in the art. Such modifications may involve other features which are already known in the field of colour liquid crystal projection display systems and which may be used instead of or in addition to features already described herein.

I claim:

1. A colour liquid crystal projection display system comprising a liquid crystal panel having a row and column array of display elements for modulating light to produce a display output, illuminating means for directing three differently-coloured light illuminating beams onto the panel such that they are incident on the panel from mutually different directions, the panel being provided with a microlens array at its input side for directing the three different colours of input light onto respective sets of the display elements in the array, each microlens element overlying a group of three display elements, and a projection lens for collecting the display output from the panel and projecting the display output onto a screen, characterised in that the directions of the three differently-coloured illuminating beams incident on the panel are selected with respect to one another and to the microlens elements of the microlens array such that at a position spaced from the output side of the panel the three beams pass respectively through substantially spatially separate areas and in that filter means are provided at said position for removing at each area light of a colour other than that of the beam associated with that area.

2. A colour liquid crystal projection display system according to claim 1, characterised in that the three beams pass respectively through substantially spatially separate areas in the aperture stop of the projection lens and in that the filter means is arranged in the region of the aperture stop.

3. A colour liquid crystal projection display system according to claim 2, characterised in that each microlens element directs light from the two illuminating beams to either side of the third illuminating beam through respective display elements to either side of one display element through which light from the third illuminating beam is directed which respective display elements are not immediately adjacent that one display element.

4. A colour liquid crystal projection display system according to claim 1, characterised in that each microlens element directs light from the two illuminating beams to either side of the third illuminating beam through respective display elements to either side of one display element through which light from the third illuminating beam is directed which respective display elements are not immediately adjacent that one display element.

5. A colour liquid crystal projection display system according to claim 4, characterised in that light from the two illuminating beams to either side of the third illuminating beam is directed respectively to the next but one display elements on either side of said one display element.

6. A colour liquid crystal projection display system according to claim 5, characterised in that the microlens elements of the array each overlie a respective group of three adjacent display elements in a row of display elements.

7. A colour liquid crystal projection display system according to claim 5, characterised in that the microlens elements of the array each overlie a respective group of three adjacent display elements in a delta arrangement.

8. A colour liquid crystal projection display system according to claim 5, characterised in that the illuminating means comprises a white light source and a set of dichroic mirrors for splitting the white light into three different colour components to produce said three differently-coloured illuminating beams.

9. A colour liquid crystal projection display system according to claim 4, characterised in that light from the two illuminating beams to either side of the third illuminating beam is directed respectively to the next but three display elements to either side of said one display element.

10. A colour liquid crystal projection display system according to claim 9, characterised in that the microlens elements of the array each overlie a respective group of three adjacent display elements in a row of display elements.

11. A colour liquid crystal projection display system according to claim 9, characterised in that the microlens elements of the array each overlie a respective group of three adjacent display elements in a delta arrangement.

12. A colour liquid crystal projection display system according to claim 9, characterised in that the illuminating means comprises a white light source and a set of dichroic mirrors for splitting the white light into three different colour components to produce said three differently-coloured illuminating beams.

13. A colour liquid crystal projection display system according to claim 4, characterised in that the microlens elements of the array each overlie a respective group of three adjacent display elements in a row of display elements.

14. A colour liquid crystal projection display system according to claim 4, characterised in that the microlens elements of the array each overlie a respective group of three adjacent display elements in a delta arrangement.

15. A colour liquid crystal projection display system according to claim 4, characterised in that the illuminating means comprises a white light source and a set of dichroic mirrors for splitting the white light into three different colour components to produce said three differently-coloured illuminating beams.

16. A colour liquid crystal projection display system according to claim 1, characterised in that the illuminating means comprises a white light source and a set of dichroic mirrors for splitting the white light into three different colour components to produce said three differently-coloured illuminating beams.

* * * * *